(No Model.)

W. F. STEARNS.
BICYCLE LOCK.

No. 589,869. Patented Sept. 14, 1897.

WITNESSES.
A. D. Grover
B. E. Shattuck
Francis C. Stanwood

INVENTOR.
William F. Stearns.
by H. E. Lodge Atty.

UNITED STATES PATENT OFFICE.

WILLIAM F. STEARNS, OF CAMBRIDGE, MASSACHUSETTS.

BICYCLE-LOCK.

SPECIFICATION forming part of Letters Patent No. 589,869, dated September 14, 1897.

Application filed September 5, 1896. Serial No. 604,939. (No model.)

*To all whom it may concern:*

Be it known that I, WILLIAM F. STEARNS, a citizen of the United States, residing at Cambridge, in the county of Middlesex and State of Massachusetts, have invented certain new and useful Improvements in Locking Attachments for Bicycles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to apparatus to be employed in preventing the use of a bicycle during the temporary absence of the rider for any cause whatsoever, and thereby secures the machine against theft or removal by active use of the wheel, either of which acts might easily take place if a safeguard of some sort were not provided.

Figure 1:
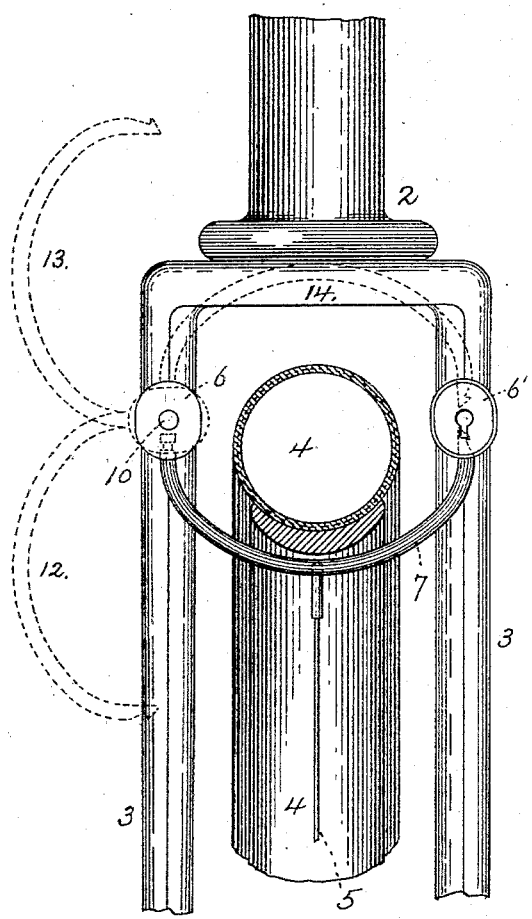
Figure 2:
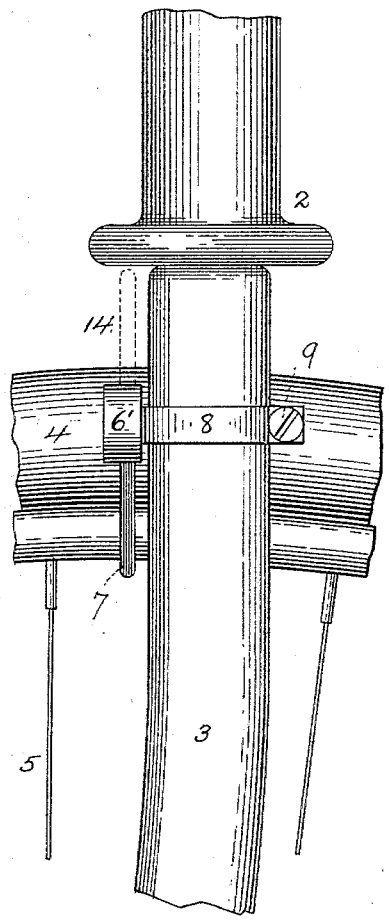

The drawings represent, in Figure 1, a front view of a bicycle-fork in part equipped with a locking device embodying my invention. In this view the wheel is illustrated in sectional elevation in part and in a locked condition. Fig. 2 is a side elevation of so much of a machine and locking attachment as is shown in Fig. 1.

The purpose of my invention is to provide a simple effective device and one which can not be easily tampered with, yet light and inexpensive, and, furthermore, one of such construction and adaptability that it may be made a part of the machine, and thus always be in readiness for use should occasion require. In addition, a further aim has been to so arrange the device that it may be attached to any form or design of bicycle now before the public without change or alteration.

In the present drawings, 2 represents the head of the front fork with the side arms at 3 3. Between these is positioned the wheel 4, while the spokes are indicated at 5.

I find by experiment that the most effective mode of fastening is to lock the wheels. Hence I have designed my locking device to operate in this manner. In the drawings, 6 6' represent two circular bosses of similar shape to be adjustably fastened to the arms 3 3 in position to admit a curved rod 7 transversely of the wheel-rim, and either above or below the same. The adjustability of this rod is produced by means of clamp-bars 8, which clasp the arms 3 and are rigidly held thereto by fastening screws or bolts 9, said clamp-bars forming a part of the bosses 6 6' before mentioned.

In the present instance the boss 6' is to contain the locking mechanism, and the boss 6 is mounted on and designed to have axial motion about the pin 10, while the fixed end, so to speak, of the rod 7 is pivotally united with said boss. These several motions derived from the swinging action of the rod and its boss are to enable said rod to be reversed in position, and thus designed to enter between the spokes and hang beneath the wheel-rim or be located above the wheel, where it remains out of the way until circumstances call for its use.

In the operation of this locking device it is very evident that various kinds of locks may be placed within the boss 6', and thus prevent the use of any ordinary key which might be employed to pick the same. As shown in Fig. 1, the device is in its active position. To release the wheel, a key is inserted in the boss 6' and the free end of the rod 7 unfastened, when it is swung back into the position shown in dotted lines at 12, the boss 6 turning axially upon its pivot. When this position of the rod is obtained, the rod itself is swung upon its pivot in the boss 6 and turned one hundred and eighty degrees until it has been reversed in position, as shown by the dotted line at 13. The rod is now tilted forward by the axial movement of the boss 6 until said rod has assumed the position 14. This is the inactive position, and it will be seen that it is just the reverse of that shown when the wheel is locked. When thus placed, it is not conspicuous, does not interfere with the brake, if one is used, and, furthermore, is not in danger of being injured or displaced.

What I claim is—

1. A locking device for bicycles comprising a rod adapted to extend transversely across the wheel-rim and provided with a free end to engage locking mechanism, and a pivotal end secured to a revoluble boss, the axis of the boss being horizontal, while the axis of the bar is vertical and at right angles to the axis of said boss, substantially as specified.

2. A locking device for bicycles, comprising a curved rod adapted for a position transversely of the path of movement of the wheel-rim, locking mechanism on the bicycle-frame to engage one end of said rod, a revoluble boss to engage the opposite end, and means to permit the rod to swing in vertical planes above or beneath the wheel-rim at a designated point, substantially as stated.

3. In combination with the front fork of a bicycle, two bosses adjustable thereupon, one boss fixed and to contain locking mechanism, a second boss for axial movement, and a curved rod pivotally attached to the movable boss, said rod to interconnect the two bosses and to extend transversely of the path of rotation of the wheel either above or below the wheel-rim at a designated point, substantially as explained.

In testimony whereof I affix my signature in presence of two witnesses.

WILLIAM F. STEARNS.

Witnesses:
H. E. LODGE,
FRANCIS C. STANWOOD.